US009963998B2

(12) United States Patent
Marsal et al.

(10) Patent No.: US 9,963,998 B2
(45) Date of Patent: May 8, 2018

(54) ASSEMBLY WITH BEARINGS AND SPACER

(71) Applicant: Honeywell International Inc., Morristown, NJ (US)

(72) Inventors: Damien Marsal, Golbey (FR); Raphaël Hettinger, La Baffe (FR); Raphaël Boileau, Thaon les Vosges (FR); Frederic Hehn, Thaon les Vosges (FR)

(73) Assignee: Honeywell International Inc., Morris Plains, NJ (US)

( * ) Notice: Subject to any disclaimer, the term of this patent is extended or adjusted under 35 U.S.C. 154(b) by 511 days.

(21) Appl. No.: 13/920,259

(22) Filed: Jun. 18, 2013

(65) Prior Publication Data
US 2014/0369865 A1    Dec. 18, 2014

(51) Int. Cl.
*F01D 25/00*    (2006.01)
*F01D 25/18*    (2006.01)
(Continued)

(52) U.S. Cl.
CPC ............ *F01D 25/186* (2013.01); *B23P 11/00* (2013.01); *B23P 11/005* (2013.01); *F01D 25/16* (2013.01); *F01D 25/162* (2013.01); *F01D 25/164* (2013.01); *F01D 25/168* (2013.01); *F02C 6/12* (2013.01); *F16C 25/083* (2013.01); *F16C 27/045* (2013.01); *F16C 33/6681* (2013.01); *F16C 35/06* (2013.01); *F05D 2220/40* (2013.01); *F05D 2230/60* (2013.01); *F16C 19/163* (2013.01); *F16C 19/548* (2013.01); *F16C 35/042* (2013.01); *F16C 35/12* (2013.01);
(Continued)

(58) Field of Classification Search
CPC ...... F04B 35/002; F16C 25/08; F16C 25/083; F04D 13/04; F01D 25/164
See application file for complete search history.

(56) References Cited

U.S. PATENT DOCUMENTS 3,017,230 A * 1/1962 Meermans .................... 384/479
3,637,271 A * 1/1972 Bayard ......................... 384/462
(Continued)

FOREIGN PATENT DOCUMENTS

| CN | 201771556 U | 3/2011 |
| JP | H06-001737 U | 1/1994 |

(Continued)

OTHER PUBLICATIONS

PCT International Search Report / Written Opinion, PCT/US2014/041001, dated Oct. 7, 2014 (11 pages).

*Primary Examiner* — Charles Freay
*Assistant Examiner* — Christopher Bobish
(74) *Attorney, Agent, or Firm* — Brian J. Pangrle

(57) ABSTRACT

A method can include providing a turbocharger housing that includes a bore; providing a spacer; providing a shaft and wheel assembly with a first rolling element bearing assembly seated on a first portion of a shaft of the shaft and wheel assembly; providing a second rolling element bearing assembly; interference-fitting the spacer into the bore; inserting a free end of the shaft into the bore and through the spacer; and inserting the second rolling element bearing assembly into the bore and seating the second rolling element bearing assembly on a second portion of the shaft such that the spacer is disposed intermediate the first portion of the shaft and the second portion of the shaft.

12 Claims, 9 Drawing Sheets

(51) Int. Cl.

| | | |
|---|---|---|
| *F01D 25/16* | (2006.01) | |
| *F02C 6/12* | (2006.01) | |
| *B23P 11/00* | (2006.01) | |
| *F16C 33/66* | (2006.01) | |
| *F16C 25/08* | (2006.01) | |
| *F16C 35/06* | (2006.01) | |
| *F16C 27/04* | (2006.01) | |
| *F16C 35/12* | (2006.01) | |
| *F16C 19/16* | (2006.01) | |
| *F16C 19/54* | (2006.01) | |
| *F16C 35/04* | (2006.01) | |

(52) U.S. Cl.
CPC ..... *F16C 2360/24* (2013.01); *Y10T 29/49236* (2015.01)

(56) References Cited

U.S. PATENT DOCUMENTS

| | | | |
|---|---|---|---|
| 4,285,632 A * | 8/1981 | DeSalve ................. 415/175 |
| 4,652,219 A * | 3/1987 | McEachern et al. ......... 417/407 |
| 4,721,441 A * | 1/1988 | Miyashita et al. ........... 417/407 |
| 4,943,170 A * | 7/1990 | Aida .............................. 384/99 |
| 4,983,050 A * | 1/1991 | Aida .............................. 384/99 |
| 4,997,290 A * | 3/1991 | Aida .............................. 384/99 |
| 5,522,667 A * | 6/1996 | Miyake ........................ 384/492 |
| 5,622,358 A | 4/1997 | Komura |
| 5,639,074 A | 6/1997 | Greenhill et al. |
| 6,971,801 B2 * | 12/2005 | Miyazaki et al. ............ 384/504 |
| 7,214,037 B2 * | 5/2007 | Mavrosakis .................. 417/407 |
| 8,985,857 B2 * | 3/2015 | Schmidt et al. ............... 384/99 |
| 2007/0036477 A1 * | 2/2007 | McKeirnan, Jr. ............ 384/517 |
| 2007/0154126 A1 * | 7/2007 | Ito ................................ 384/516 |
| 2007/0183704 A1 | 8/2007 | Umekawa |
| 2007/0280824 A1 * | 12/2007 | Ward ............................ 415/175 |
| 2011/0052429 A1 * | 3/2011 | Marsal .................. F01D 25/162 |
| | | | 417/407 |
| 2012/0282078 A1 | 11/2012 | Marsal |

FOREIGN PATENT DOCUMENTS

| | | |
|---|---|---|
| JP | 2002129669 A | 5/2002 |
| JP | 2002129967 A | 5/2002 |
| JP | 2002129968 A | 5/2002 |
| JP | 2002242937 A | 8/2002 |
| JP | 2005171796 A | 6/2005 |
| JP | 2005172099 A | 6/2005 |
| JP | 2006090402 A | 4/2006 |
| JP | 2009204004 | 9/2009 |
| JP | 2009-293614 A | 12/2009 |
| WO | 2002006649 A1 | 1/2002 |
| WO | 2005057032 A1 | 6/2005 |
| WO | 2005073575 A1 | 8/2005 |

* cited by examiner

ASSEMBLY WITH BEARINGS AND SPACER

TECHNICAL FIELD

Subject matter disclosed herein relates generally to turbomachinery for internal combustion engines and, in particular, to assemblies that include bearings.

BACKGROUND

Exhaust driven turbochargers can include a rotating shaft carrying a turbine wheel and a compressor wheel where the shaft is typically rotatably supported within a center housing (e.g., intermediate a compressor and a turbine) by one or more lubricated bearings (e.g., oil lubricated). During operation, exhaust from an internal combustion engine drives a turbocharger's turbine wheel, which, in turn, drives the compressor wheel to boost charge air to the internal combustion engine.

During operation, a turbocharger's rotating assembly may reach rotational speeds in excess of 100,000 rpm (e.g., some may reach rotational speeds of 250,000 rpm or more). To handle such high speeds, a turbocharger's center housing rotating assembly (CHRA) requires balance and adequate lubrication. Factors such as noise, vibration and harshness (NVH), as well as efficiency, are often interrelated and must be within acceptable limits. As an example of interrelatedness, vibration can generate noise and reduce efficiency. Further, under dynamic conditions, such as an increase in exhaust flow, axial thrust forces can cause contact between various CHRA components. Contact can cause wear, which, in turn, can alter balance, leading to increased noise, vibration, etc., and reduced efficiency.

Turbocharger bearing systems may offer both support and damping to control motion of a turbocharger shaft, for example, to help isolate vibrations from rotating parts while allowing the turbocharger shaft to spin, for example, at speeds that may be about 60 times faster than a maximum engine speed (e.g., consider a diesel engine). A turbocharger bearing system may help ensure turbocharger operational efficiency by keeping frictional losses and NVH low such that energy from the engine exhaust gas is available to drive the turbocharger. Where operational conditions may vary, a turbocharger bearing system may be selected to help balance low-power losses with an ability to control forces applied by varying mechanical loading (e.g., thrust and other forces).

As to turbocharger bearing system hydrodynamics, fluid (e.g., oil or other lubricant) may lubricate components and also influence motion of a turbocharger shaft. As an example, a "fully-floating" bearing system can include a journal bearing that supports a shaft using an outer film disposed between a bore wall of a center housing and an outer surface of the journal bearing and an inner film disposed between an inner surface of the journal bearing and an outer surface of the shaft. In such an example, the journal bearing may rotate (azimuthally) at approximately one-half the speed of the shaft and move axially and radially (i.e., the journal bearing is fully-floating).

As to a "semi-floating" approach, an anti-rotation mechanism may act limit rotation (azimuthally) of a journal bearing or, for example, an outer race of a REB assembly. As an example, a semi-floating journal bearing or a semi-floating REB assembly may support a shaft using, in part, an outer oil film disposed between an outer surface of the journal bearing or an outer surface of the REB assembly and a bore wall of a center housing where the outer oil film acts as a "squeeze film", for example, to damp undesirably shaft motions.

As an example, a turbocharger may include one or more rolling element bearing (REB) assemblies, which may be, for example, one or more ball bearing assemblies. An REB assembly can include an outer race, an inner race and rolling elements disposed between the inner and outer races (e.g., in a raceway or raceways). For example, consider an REB assembly that includes a unitary outer race and a two-piece inner race fit to a turbocharger shaft (e.g., a shaft and wheel assembly (SWA) where rolling elements allow for rotation of the shaft and two-piece inner race with respect to the outer race). In such an example, the outer race of the REB assembly may be "located" in a bore of a housing such as a center housing (e.g., disposed between a compressor housing and a turbine housing). As an example, to axially locate an outer race in a bore of a center housing, a counter-bore and a plate may be positioned at a turbine side and a compressor side of the center housing where each forms an opening with a diameter less than an outer diameter of the outer race. In such an example, the REB assembly may be placed in the bore followed by receipt of a shaft (e.g., a SWA) or, for example, the REB assembly may be fit to the shaft (e.g., a SWA) and then inserted into the bore (e.g., as a unit that includes the REB assembly and the shaft). Further, an anti-rotation mechanism may be provided that locates the outer race in the bore of the center housing by limiting rotation of the outer race (e.g., azimuthal direction). In such an example, the REB assembly may be "semi-floating", for example, having an ability to move in a radial direction where radial clearances between an outer surface of the outer race and a bore surface of the center housing provide for squeeze film formation (e.g., one or more lubricant films).

Various examples of technologies, techniques, etc., described herein pertain to assemblies, housings, bearing assemblies, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
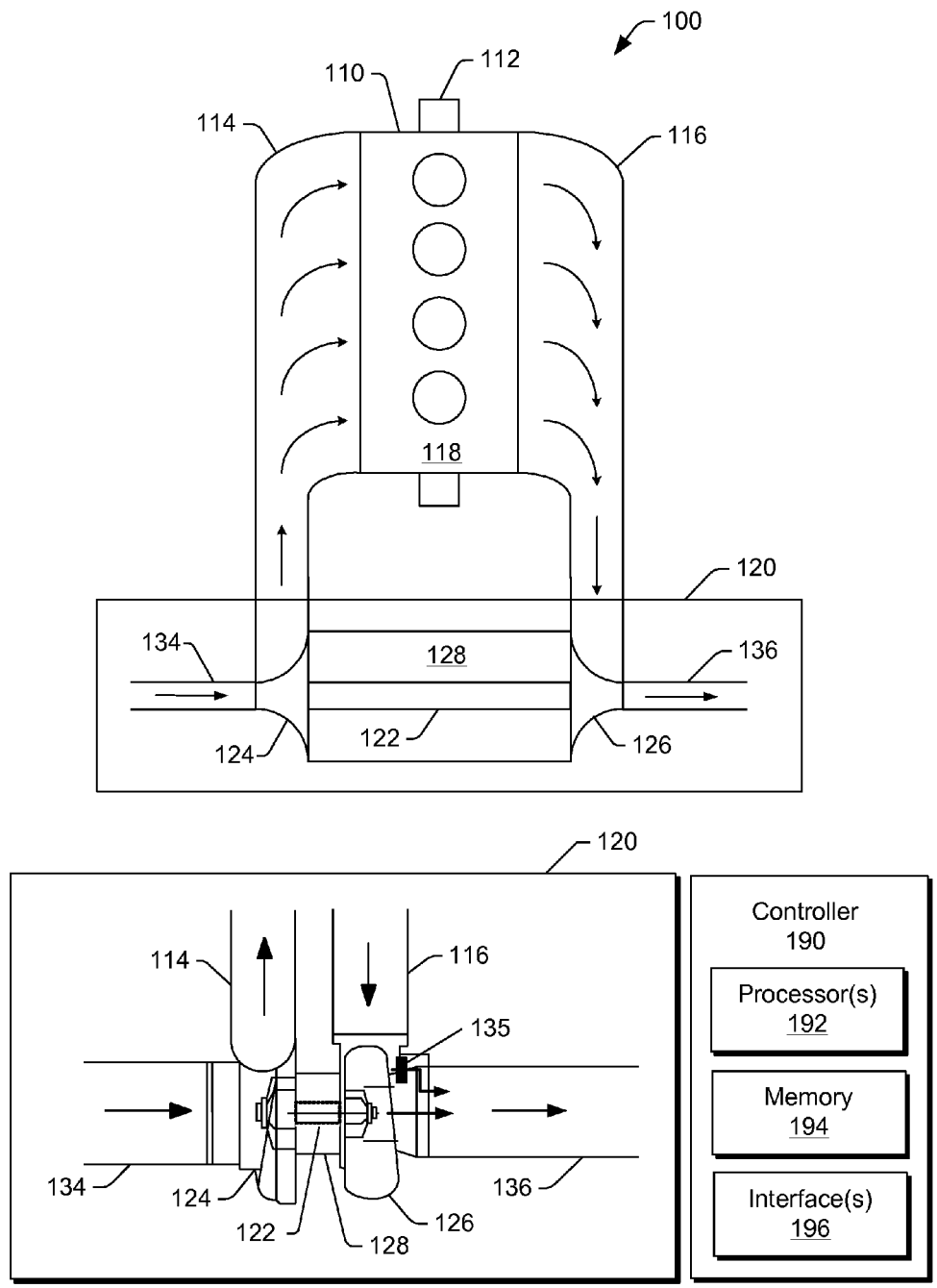
FIG. 1 is a diagram of a turbocharger and an internal combustion engine along with a controller.

Various examples of turbocharger bearing assemblies are described herein. As an example, a turbocharger bearing assembly can include a spacer configured to space two turbocharger bearings. Such a spacer may be configured as an annular body that defines a central through bore and that includes an axial end face and an opposing axial end face. In such an example, the spacer may include a diameter (e.g., or radii) that provide for an interference fit with respect to a wall or walls of a bore of a housing. For example, a spacer may be interference-fit into a bore of a housing to be retained in the bore of the housing with a static force sufficient to axially locate one or more bearing assemblies. In such an example, the spacer may space and, at least in part, axially locate a compressor side bearing assembly and a turbine side bearing assembly, which may be, for example, rolling element bearing (REB) assemblies (e.g., ball bearing assemblies). As another example, a spacer may be integral to a housing, for example, formed by machining a housing with a through bore and a compressor side and a turbine side counterbore, countersink, etc. (e.g., where a spacer bore portion exists between the counterbores, countersinks, etc.).

As an example, a spacer may include a spring or springs, for example, where such a spring or springs may act to damp axial thrust forces, enhance balanceability (e.g., of a CHRA), etc. As an example, springs may be provided as a biasing unit or biasing mechanism. Such a unit or mechanism may be configured to simultaneously contact a compressor side bearing assembly and a turbine side bearing assembly. For example, such a unit or mechanism may contact an outer race of a compressor side ball bearing assembly and may contact an outer race of a turbine side ball bearing assembly.

As an example, a method can include interference-fitting a spacer into a bore of a housing, inserting a shaft with a first rolling element bearing assembly fitted thereto into the bore where the shaft extends axially through the spacer and inserting a second rolling element bearing assembly into the bore while fitting it to the shaft. For example, the housing may be a turbocharger center housing, the shaft may be a shaft and wheel assembly (SWA), the first rolling element bearing assembly may be a turbine side rolling element bearing assembly and the second rolling element bearing assembly may be a compressor side rolling element bearing assembly. A method may further include operating a turbocharger while axially locating, via a spacer, a turbine side rolling element bearing assembly and a compressor side rolling element bearing assembly where a spacer is disposed axially between the two rolling element bearing assemblies by having been interference-fit into a bore of a housing of the turbocharger. In such an example, the spacer may provide for contacting an outer race of the turbine side rolling element bearing assembly and for contacting an outer race of the compressor side rolling element bearing assembly.

As an example, a spacer may be an assembly, for example, that includes one or more springs. As an example, a spring may be disposed in a central through bore of a spacer. For example, a wave spring may have an uncompressed length that exceeds a length of a spacer such that the wave spring can load one or more bearing assemblies disposed adjacent to the spacer. As an example, squeeze films of an outer race of a turbine side rolling element bearing assembly and an outer race of a compressor side rolling element bearing assembly (e.g., with respect to respective clearances with bore wall portions) may in combination with a spring disposed in a bore of a fixed spacer enhance performance of a turbocharger (e.g., a turbocharger CHRA). As an example, performance may be enhanced by a spring, for example, as to balanceability. As an example, one or more squeeze films may help to enhance performance, for example, by damping vibrations, etc. that may occur during operation of a turbocharger. As an example, an outer race of one or more bearing assemblies may be fully-floating or semi-floating.

In various examples, a spacer may include one or more lubricant wells located at an axial end face. For example, a spacer may include an annular compressor end well and an annular turbine end well, which may be symmetric or asymmetric (e.g., on an end or one end compared to the other end). Such features may act as thrust pads with respect to outer races. As an example, a spacer may include a lubricant passage to direct lubricant to one or more lubricant wells of an axial end face of a bearing (e.g., a lubricant manifold, etc.). As an example, formation of one or more lubricant films may occur between a spacer and one or more bearing assemblies. With increased damping provided by lubricant films and spring loading, certain vibrations may be diminished in dynamic imbalance measurements, which may allow for improved assembly balancing (e.g., to reduce NVH).

Below, an example of a turbocharged engine system is described followed by various examples of components, assemblies, methods, etc.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components. In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc.

Figure 2:
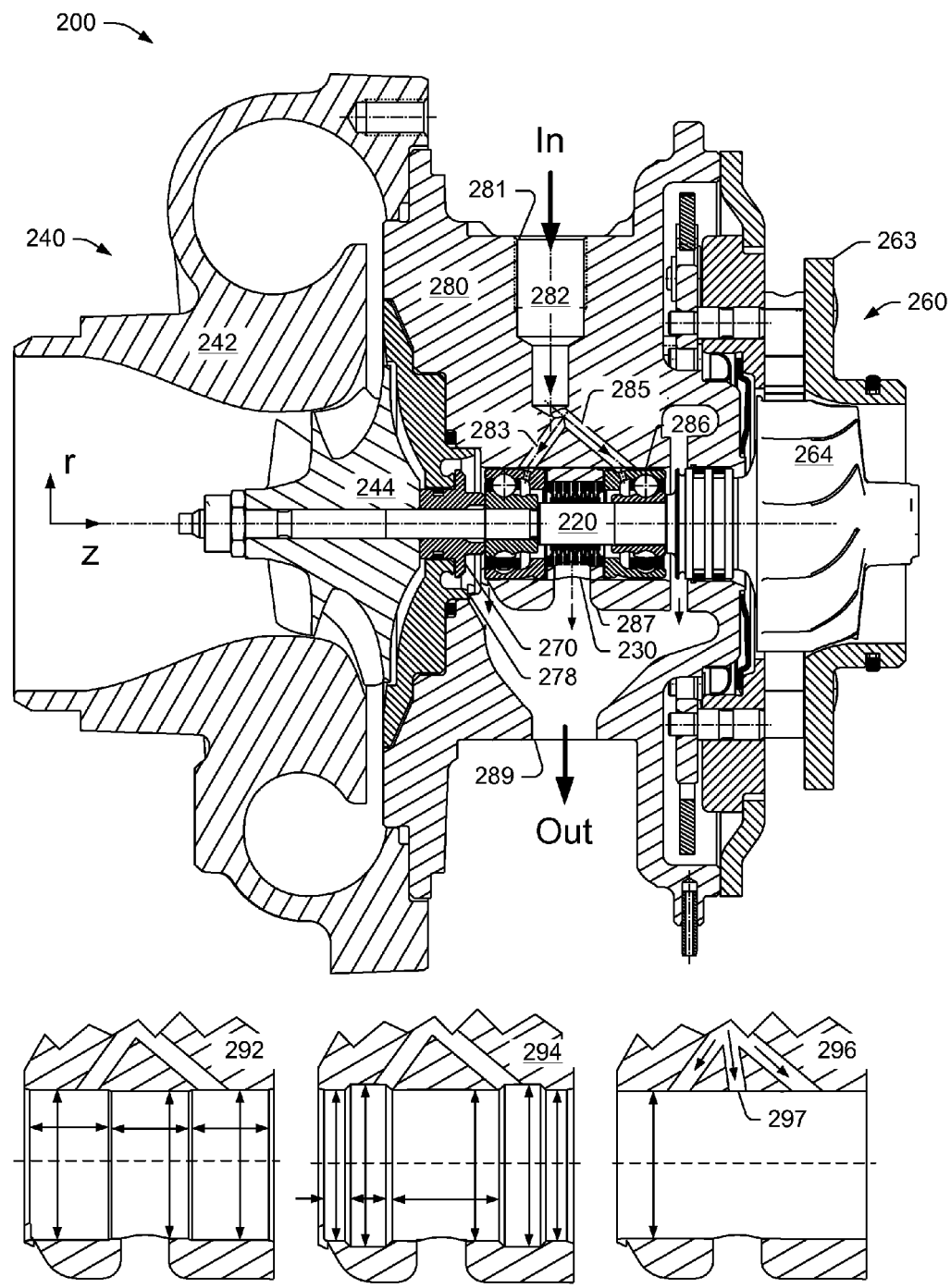
FIG. 2 is a series of cross-sectional views of an example of a turbocharger assembly that includes a bearing assembly or system with two bearing assemblies and a spacer and of examples of housings with various through bore features.

FIG. 2 shows an example of a turbocharger assembly 200 that includes a shaft 220 supported by a bearing assembly 230 disposed in a housing 280 between a compressor 240 and a turbine 260. In the example of FIG. 2, the assembly 200 also includes a thrust collar 270 disposed in a bore of a compressor plate 278. The compressor 240 includes a compressor housing 242 that defines a volute and that houses a compressor wheel 244. The turbine 260 is shown as including a base and shroud assembly 263 that defines a throat to direct exhaust to a turbine wheel 264.

In the example of FIG. 2, the housing 280 includes a lubricant inlet 281 and a lubricant outlet 289. Lubricant flows from the inlet 281 to the outlet 289 via a bore 282 that directs lubricant to various lubricant passages with openings along an axial bore 286 of the housing 280. For example, the housing 280 includes a compressor side bearing lubricant passage 283 and a turbine side bearing lubricant passage 285. Lubricant may exit the bore 286 via a compressor end, a turbine end and/or a passage 287 disposed between the compressor end and the turbine end. The outlet 289 collects lubricant that flows through or around the bearing assembly 230, which may then be cooled, filtered, etc., and eventually recirculated to the inlet (e.g., via a lubricant pump of an internal combustion engine). To assist with flow of lubricant, the inlet 281 and the outlet 289 may be aligned with gravity. As an example, in a non-operational state, a rotating assembly may rest in the bore 286 along a lower bore wall surface (e.g., due to gravity). Upon commencement of an operational state, the rotating assembly may lift off a bore wall surface, for example, at least in part due to lubricant flow, lubricant film formation, etc.

As mentioned, during operation, thrust forces may be generated and transmitted along an axial direction, as represented by a z-axis. Such forces may be directed toward the compressor end or toward the turbine end. As an example, a spring can apply preload to bearing assemblies, which may optionally assist with damping axial vibration. While a particular assembly may not include a spring, as an example, inclusion of a spring (or springs) may provide for more certain and defined preloading. For example, a spring may create a substantially constant force on a compressor side bearing to help stabilize a CHRA. As an example, a spring may be a biasing mechanism; accordingly, an assembly may include a spacer and a biasing mechanism (e.g., a spacer assembly or subassembly).

FIG. 2 also shows various examples of housings 292, 294 and 296. As an example, the housing 292 includes a through bore with a compressor bore portion formed by a portion of a wall of the housing 292, a spacer bore portion formed by a portion of a wall of the housing 292, and a turbine bore portion formed by a portion of a wall of the housing 292. For the example housing 292, the diameters of the compressor bore portion and the turbine bore portion are greater than for the spacer bore portion. As an example, the housing 294 includes a through bore with a compressor bore portion formed by a portion of a wall of the housing 294, a spacer bore portion formed by a portion of a wall of the housing 294, and a turbine bore portion formed by a portion of a wall of the housing 294. In such an example, the compressor bore portion and the turbine bore portion may optionally include recess portions. As an example, the housing 296 includes a through bore with a compressor bore portion formed by a portion of a wall of the housing 296, a spacer bore portion formed by a portion of a wall of the housing 296, and a turbine bore portion formed by a portion of a wall of the housing 296. In such an example, the diameter may be approximately constant over a length of the through bore (e.g., over a compressor portion, a spacer portion and turbine portion). As shown in FIG. 2, the housing 296 may include a lubricant path 297 (e.g., bore or conduit formed by the housing 296) that can direct lubricant to the spacer portion of the through bore. In such an example, the lubricant path 297 may optionally be used during an assembly process, for example, to facilitate installation of the spacer in the through bore. As an example, lubricant may assist with an interference fitting process. For example, consider a process that uses a temperature differential that may use lubricant to deliver and/or remove heat energy from a spacer. As an example, a lubricant or other fluid may be delivered (e.g., or removed via vacuum) through use of one or more of the lubricant paths during an assembly process. As an example, a lubricant delivered during assembly may differ from an engine oil and be selected to assist an interference fitting process. As an example, a fluid may be provided that helps to secure a spacer in a bore.

In the various examples of FIG. 2, outer races of the bearing assemblies and the spacer may be appropriately sized, for example, to cooperate with various features of one or more of the example housings (e.g., or other housing).

Figure 3:
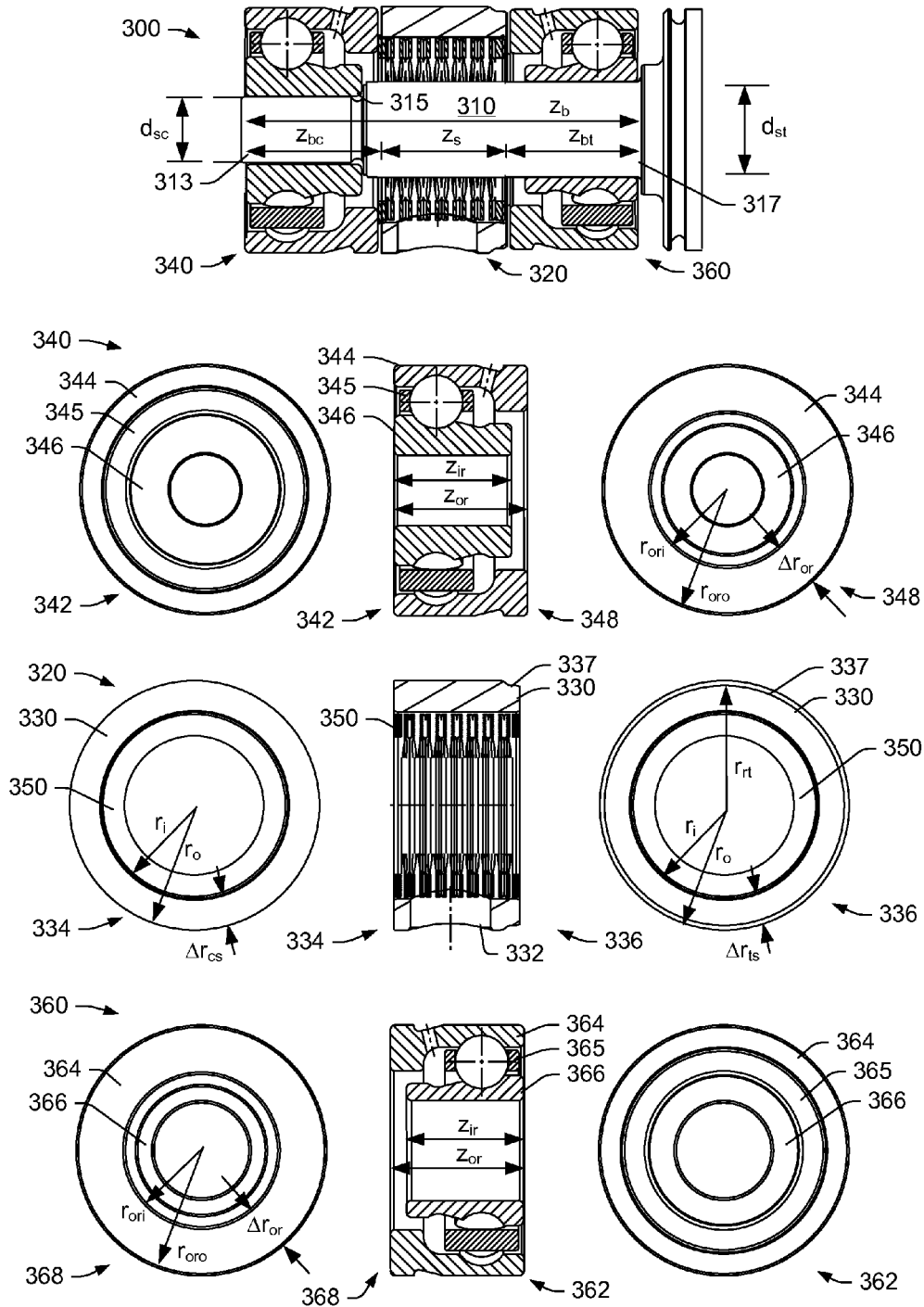
FIG. 3 is a series of views of an example of a bearing assembly or system and examples of components thereof.

FIG. 3 shows an example of a bearing assembly 300 that includes a spacer and spring subassembly 320, a compressor bearing assembly 340 and a turbine bearing assembly 360. As shown, the compressor bearing assembly 340 includes opposing ends 342 and 348, an outer race 344, rolling elements 345 and an inner race 346. For the end 348, the outer race 344 has an inner radius $r_{ori}$ and an outer radius $r_{oro}$, which provide for an axial end face of annular dimension $\Delta r_{or}$ substantially therebetween. Further, the inner race 346 has an axial length $z_{ir}$ while the outer race 346 has a larger axial length $z_{or}$; thus, for the end 348, the inner race 346 is inset from the axial end face of the outer race 344. As shown, the turbine bearing assembly 360 includes opposing ends 362 and 368, an outer race 364, rolling elements 365 and an inner race 366. For the end 368, the outer race 364 has an inner radius $r_{ori}$ and an outer radius $r_{oro}$, and an axial end face of annular dimension $\Delta r_{or}$ substantially therebetween. Further, the inner race 366 has an axial length $z_{ir}$ while the outer race 364 has a larger axial length $z_{or}$; thus, for the end 368, the inner race 366 is inset from the axial end face of the outer race 364. While the example of FIG. 3 shows balls as rolling elements, a bearing assembly may include another type of rolling element (e.g., cylinders, etc.).

As an example, the axial length of an outer race of a bearing may be of a length that acts to sufficiently reduce tilting of the outer race with respect to a central axis of a bore of a housing. For example, one or both bearing assemblies 340 and 360 may have an outer race with a respective axial length $z_{or}$ that is approximately equal to or greater than a respective outer race radius $r_{oro}$.

In the example of FIG. 3, the inner races 346 and 366 of the bearings 340 and 360 differ to accommodate a shaft 310 with a stepped diameter (e.g., which may form a shoulder). Specifically, the shaft 310 includes a compressor side surface 313 disposed at a diameter $d_{sc}$, a turbine side surface 317 disposed at a diameter $d_{st}$ and an annular face 315 located at a step between the differing diameters where the annular face 315 is configured to abut the inner race 346 of the compressor bearing assembly 340 (e.g., to locate the shaft 310 with respect to the spacer and spring subassembly 320).

In the example of FIG. 3, the spacer and spring subassembly 320 includes a spacer 330 and a spring 350. The spacer 330 is shaped as an annular body with opposing axial end faces 334 and 336. As an example, the spacer 330 can include a recessed diameter portion 337 adjacent to the axial end face 336 (e.g., which may be a leading face during insertion into a bore of a housing). The spacer 330 may include a lubricant drain opening 332, for example, to provide for drainage of lubricant to a drain of a housing (see, e.g., the drain opening 287 of the housing 280 of FIG. 2). As an example, such an opening may assist with positioning the spacer (e.g., consider access via a drain or lubricant outlet such as the outlet 289 of FIG. 2).

Various dimensions are also shown in the example of FIG. 3, including, at each end 334 and 336, a spacer inner radius $r_i$, a spacer outer radius $r_o$, and a recessed radius $r_{rt}$ (e.g., a turbine side recessed radius). In FIG. 3, axial end faces are defined as existing substantially between the inner and outer radii, $\Delta r_{cs}$ and $\Delta r_{ts}$. As an example, one or more dimensions may be the same or different for each end 334 and 336 of the spacer 330.

In the example assembly 300, the axial end face 334 of the spacer 330 faces the axial end face 348 of the outer race 344 of the compressor bearing assembly 340 and the axial end face 336 of the spacer 330 faces the axial end face 368 of the turbine bearing assembly 360. As shown in the example of FIG. 3, the spring 350 can provide for application of a load. As an example, for a spring disposed at least partially in a through bore of a spacer, an end of the spring may be configured to apply a load to a race of a bearing assembly. While the example of FIG. 3 shows a single spring (e.g., a compound spring), as described herein, a subassembly may include more than one spring.

Figure 4:
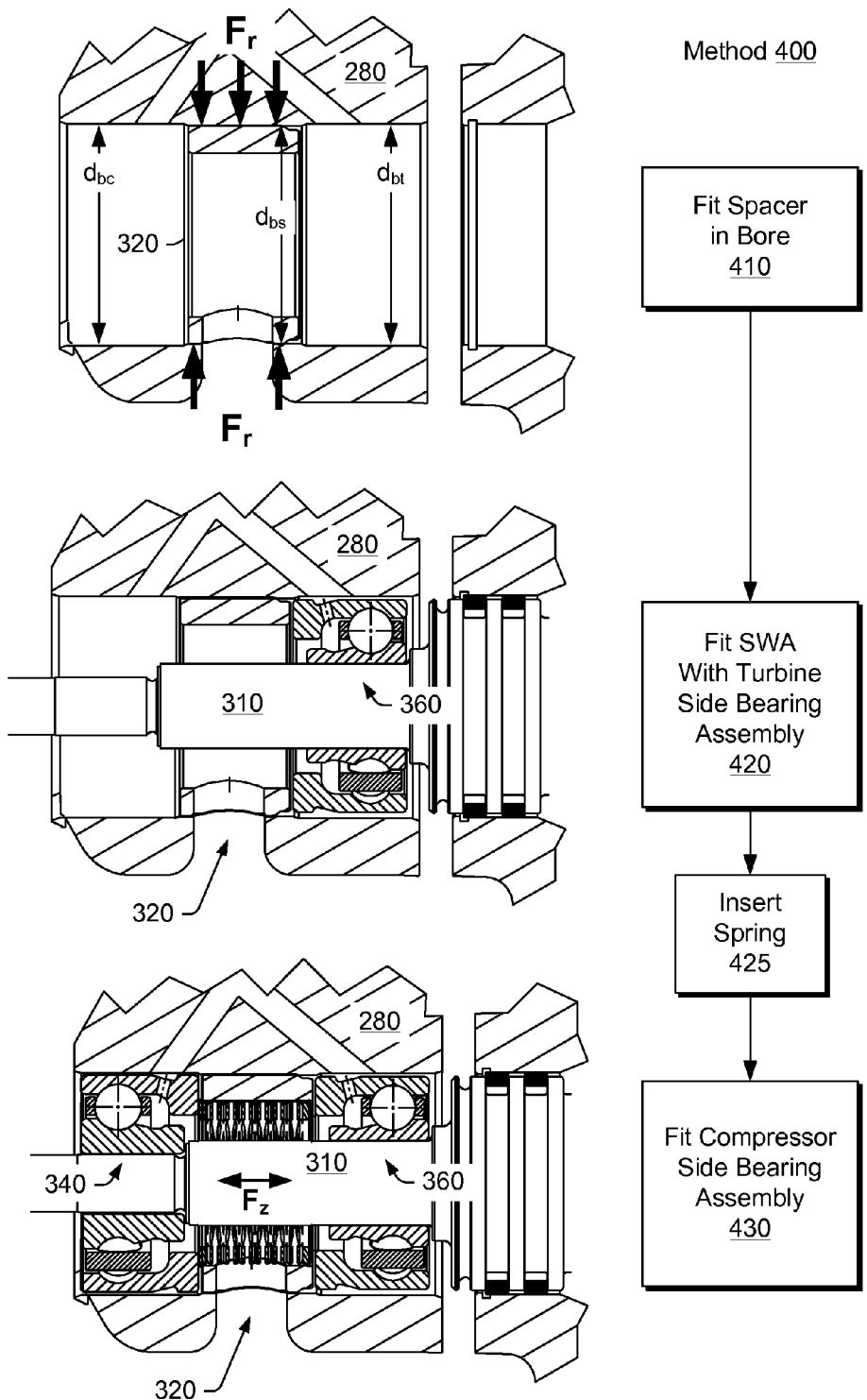
FIG. 4 is a block diagram of an example of a method and a series of views of examples of components in various stages of assembly.

FIG. 4 shows an example of a method 400 as well as various components in various stages of assembly. As shown the method 400 includes a fit block 410 for fitting a spacer in a bore of a housing (see, e.g., the spacer assembly 320 and the housing 280), a fit block 420 for fitting a SWA with a turbine side bearing assembly into the bore of the housing (see, e.g., the shaft 310 and the turbine side bearing assembly 360), and a fit block 430 for fitting a compressor side bearing assembly into the bore of the housing where the compressor side bearing assembly receives a portion of the shaft (see, e.g., the compressor side bearing assembly 340). As an example, per an insertion block 425, a spring may be inserted into the spacer, for example, after fitting of the SWA with the turbine side bearing assembly into the bore of the housing.

As shown in the example of FIG. 4, the bore of the housing 280 includes a compressor side bore diameter $d_{bc}$, a turbine side bore diameter $d_{bt}$ and a spacer bore diameter $d_{bs}$. Per the method 400, the spacer is interference-fit into the bore of a housing. As an example, a compressor side diameter of a bore and/or a turbine side diameter of the bore may be greater than a spacer bore diameter of the bore. As an example, a spacer bore diameter may be intermediate well diameters, for example, that provide clearances for flow of lubricant and optionally lubricant film formation (e.g., thicker films than may be formed between an outer surface of an outer race and the compressor side diameter or the turbine side diameter).

As an example, to achieve an interference fit, the diameter of a spacer may exceed that of a spacer portion of a bore. For example, where a spacer portion of a bore has a diameter of about 15 mm, a spacer may be provided with a larger diameter, for example, a diameter of about 15.01 mm to about 15.05 mm. A diameter differential between a spacer and a spacer portion of a bore may be selected to achieve an appropriate static force of an interference fit (e.g., a static friction force). As an example, where the interference fit is achieved via a press-fitting force that axially translates a spacer into a bore (e.g., or a housing onto a spacer), axial force applied during press-fitting may be of the order of several hundreds of newtons or more (e.g., greater than about 500 N and optionally greater than about a 1000 N). As an example, where rotor axial load may be less than about 200 N, force for fitting or achieved static force may be greater than 200 N, for example, multiplied by a safety factor to provide a safety margin (e.g., a multiple of the maximum rotor axial load). As to positioning the spacer in a spacer bore portion of a bore of a housing, temperature may be a variable. For example, heating and/or cooling may be used to increased and/or decrease size of a component (e.g., via thermal expansion and/or thermal contraction) where, upon reaching equilibrium, a desired static force is achieved. As an example, to achieve an interference fit, a shrink-fitting process may be employed.

As an example, a method may include inserting a spacer into a bore of a center housing using a tool and pushing the spacer until it comes into contact against a bore surface of the center housing followed by controlling its axial position via metrology. Next, a turbine side ball bearing assembly and SWA may be inserted into the bore using a tool, for example, where it is pushed axially until contact occurs with the spacer, the bore surface that seats the spacer, etc. The axial depth of the turbine side ball bearing assembly and the SWA may be such that piston rings mounted to the SWA are seated in a corresponding bore portion of the center housing. The method may then include inserting a spring into the spacer, for example, via a tool, by hand, etc. With the spring inserted, a compressor side ball bearing assembly may be inserted into the bore using a tool, for example, until it comes in contact against the step of a shaft of the SWA.

As an example, once the spacer, the two ball bearing assemblies and the SWA are inserted into the bore of the housing, an extended seal plate (e.g., a back plate) may be attached to a compressor side of the housing, for example, with a thrust collar disposed in a bore of the seal plate. A compressor wheel may then be fit via a free end of the shaft of the SWA, which may include, for example, a through bore or a partial bore. The compressor wheel may be tightened until a stretch target is reached (e.g., axial stretch with respect to the shaft).

As an example, a spacer may include a slot or other feature, for example, to facilitate alignment of the spacer in a bore of a housing (e.g., with respect to a lubricant drain, etc.). For example, the spacer 330 may include a slot to facilitate alignment of the opening 332 with a lubricant opening of a housing. In such an example, a visual inspection of the opening 332 with respect to a lubricant opening in a through bore of a housing may be possible via an outlet such as the outlet 289 of FIG. 2.

As an example, the method 400 may act to secure a spacer in a housing between a turbine side rolling element bearing assembly and a compressor side rolling element bearing assembly via an interference fit with a spacer bore wall of a through bore of the housing where the spacer forms a turbine side axial stop that limits the axial position of an outer race of the turbine side rolling element bearing assembly and forms a compressor side axial stop that limits the axial position of an outer race of the compressor side rolling element bearing assembly.

As an example, a spacer may be an axial stop for a first rolling element bearing assembly and an axial stop for a second rolling element bearing assembly. For example, when secured in a through bore of a housing, opposing axial faces of a spacer may be positioned at axial locations (e.g., with respect to an axis of the through bore) that define axial limits for movement of a turbine side rolling element bearing assembly toward a compressor side of the housing and for movement of a compressor side rolling element bearing assembly toward a turbine side of the housing, respectively. As an example, a spring may be disposed in a spacer and be axially compressible to allow contact between a rolling element bearing assembly and the spacer.

In the example of FIG. 4, the shaft can include a first portion and a second portion, for example, where the spacer is disposed intermediate the first portion of the shaft and the second portion of the shaft and, for example, where an inner race of a first rolling element bearing assembly may be seated on the first portion of the shaft and where an inner race of a second rolling element bearing assembly may be seated on the second portion of the shaft.

As an example, a method may include interference-fitting a spacer by applying an axial force differential and/or by creating a temperature differential between the spacer and a housing. As to creating a temperature differential, such a method may then include allowing the spacer and the housing to return to an equilibrium temperature. As an example, such a process may be referred to as "shrink-fitting" (e.g., by cooling the spacer and/or by heating the housing).

As an example, a method may include providing an anti-rotation mechanism for at least one rolling element bearing assembly and limiting rotation of an outer race of the at least one rolling element bearing assembly.

Figure 5:
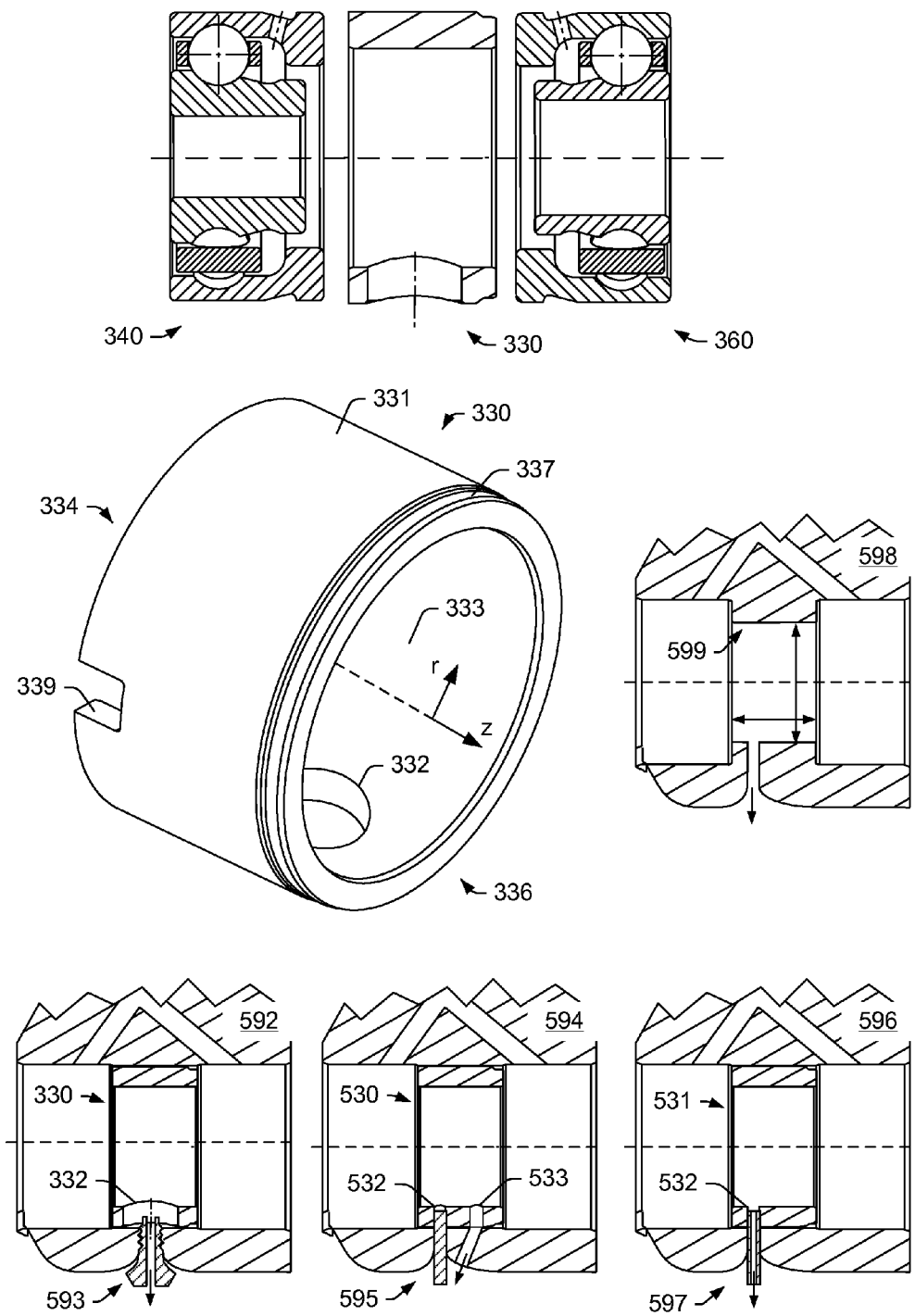
FIG. 5 is a series of views of an example of an assembly and a spacer configured to space two bearing assemblies and some examples of assemblies.

FIG. 5 shows a cross-sectional view of the spacer 330 disposed between the compressor side bearing assembly 340 and the turbine side bearing assembly as well as a perspective view of the spacer 330. FIG. 5 shows the spacer 330 as including a slot 339 that extends from the end 334 to an axial depth, for example, between an outer surface 331 and an inner surface of the spacer 330 (e.g., a radial thickness of the spacer 330). In the example of FIG. 5, the slot 339 is positioned at approximately 90 degrees with respect to the opening 332. As an example, a spacer may include an orientation feature or features to facilitate alignment, for example, azimuthal alignment of the spacer with respect to a feature or features of a housing.

FIG. 5 also shows some examples of assemblies as including housings 592, 594 and 596. As an example, the housing 592 may include an opening for receipt of a pin 593, which may limit rotation of the spacer 330 and/or limit axial movement of the spacer 330. In the example of FIG. 5, the pin 593 can include a bore, for example, for passage of fluid from the spacer 330 to a drain of the housing 592. As an example, the housing 594 may include an opening for receipt of a pin 595 and optionally another opening for passage of fluid. As shown, a spacer 530 may include an opening 532 for receipt of the pin 595 and optionally another opening 533 for passage of fluid. As an example, the pin 595 may apply pressure to the spacer 530 to secure the spacer 530 in a spacer bore portion of the through bore of the housing 595. Such an approach may optionally supplement an interference fit between the spacer 530 and the housing 595 (e.g., to apply additional force, as a back-up mechanism, etc.). As an example, such an approach may optionally provide for orienting the spacer 530 in the housing 595, for example, during an interference fitting process. As an example, consider a shrink-fitting process where the pin may optionally be removed once an interference fit has been achieved (e.g., thermal equilibrium reached for two components) or, for example, where the pin may be retained (e.g., during further assembly, during operation, etc.). As an example, the housing 596 may include an opening for receipt of a pin 597, which may engage an opening 532 of a spacer 531, for example, for one or more purposes (e.g., functions). For example, the pin 597 may secure and/or locate the spacer 531 axially within a through bore of the housing 597. In the example of FIG. 5, the pin 597 may optionally include a bore for passage of fluid (e.g., for purposes of one or more of assembly, operation, etc.).

FIG. 5 also shows an example of a housing 598, which includes an integral spacer bore portion 599, for example, which may be achieved via machining or other process. In such an example, a spring may be positioned in the integral spacer bore portion, for example, to enhance balanceability, performance, etc. As an example, the integral spacer bore portion 599 may include one or more openings, for example, for passage of fluid. As an example, an assembly process that includes providing a housing such as the housing 598 may proceed, for example, per the blocks 420, 425 and 430 of the method 400 of FIG. 4. As an example, a spacer may optionally include features that provide for crimping, for example, to secure the spacer in a bore of a housing.

As an example, an outer race (e.g., or outer ring) of a rotating element bearing (REB) assembly may be fully floating within a through bore of a housing. In such an example, a difference of friction between rolling elements and a lubricant film (e.g., on an inner side and an outer side of the outer race) may act to diminish rotational speed of the outer race during operation and, for example, help to avoid sub synchronous motion, wear, etc. (e.g., in comparison to a floating journal bearing).

As an example, a bore wall and a surface of an outer race may provide for two or more clearances (e.g., radial clearances, each with an axial length) to which lubricant may flow. In such an example, one clearance may provide for formation of a thin lubricant film and another clearance may provide for formation of a thicker lubricant film. As to some examples, a thinner film may form axially disposed between two thicker films and/or a thicker film may form axially disposed between two thinner films. As an example, a thinner film may form in a clearance that has an axial length that is less than that of a clearance that provides for formation of a thicker film (e.g., where the lengths thereof may account for fluid dynamics during operation). As an example, a turbine side may differ from a compressor side with respect to radial clearance or radial clearances.

Figure 6:
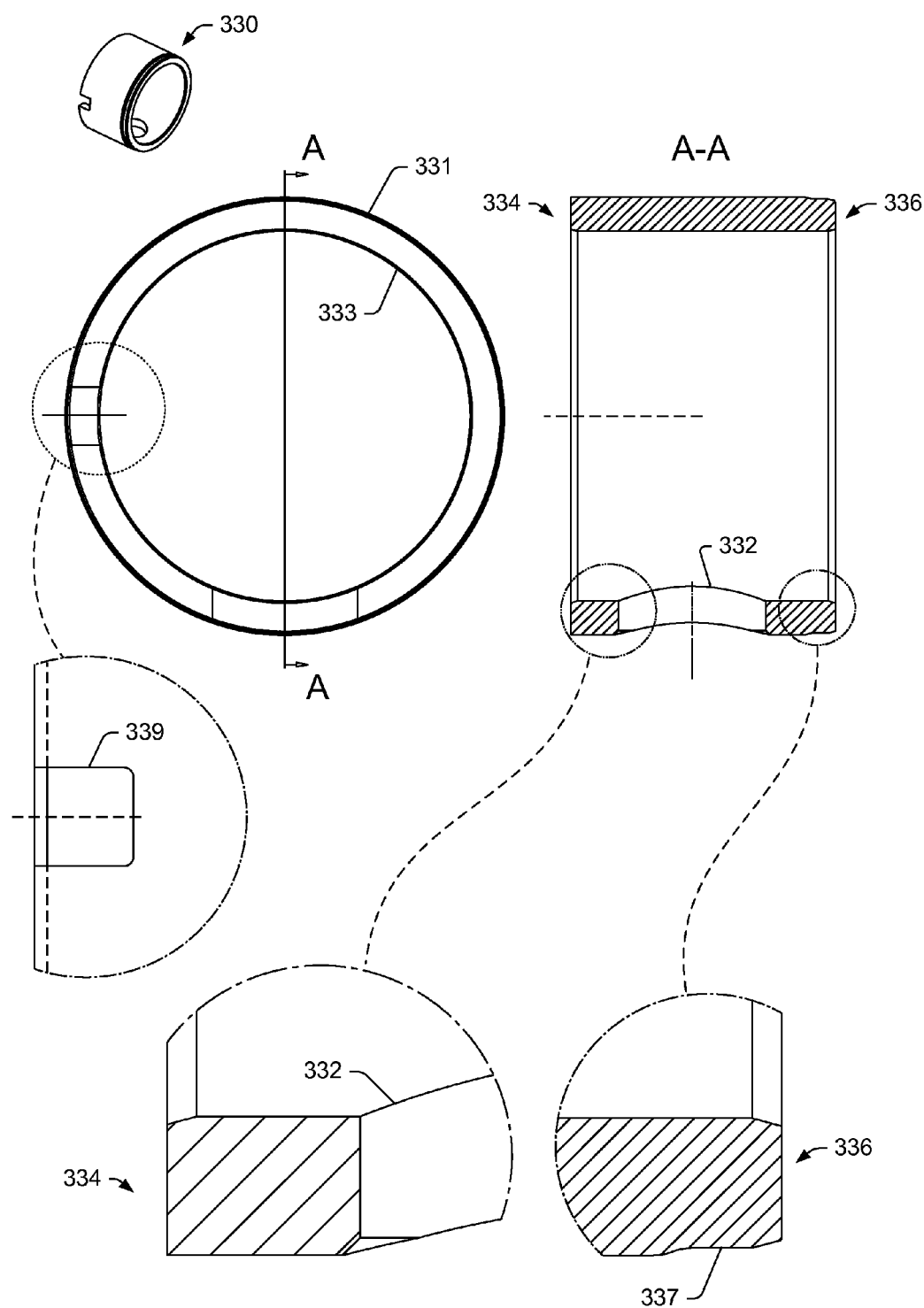
FIG. 6 is a series of views of an example of a spacer.

FIG. 6 shows a perspective view of the spacer 330, an end view of the spacer 330, a cross-sectional view along a line A-A and various enlarged views of features of the spacer 330. In the example of FIG. 6, the various features may be defined, for example, with respect to a cylindrical coordinate system (e.g., r, z and Θ). As an example, the recessed surface 337 of the spacer 330 may be on an insertion end, for example, a leading end that is inserted into a bore of a housing while the opposing end may be a trailing end. As an example, the leading end may be a turbine end while the trailing end may be a compressor end.

Figure 7:
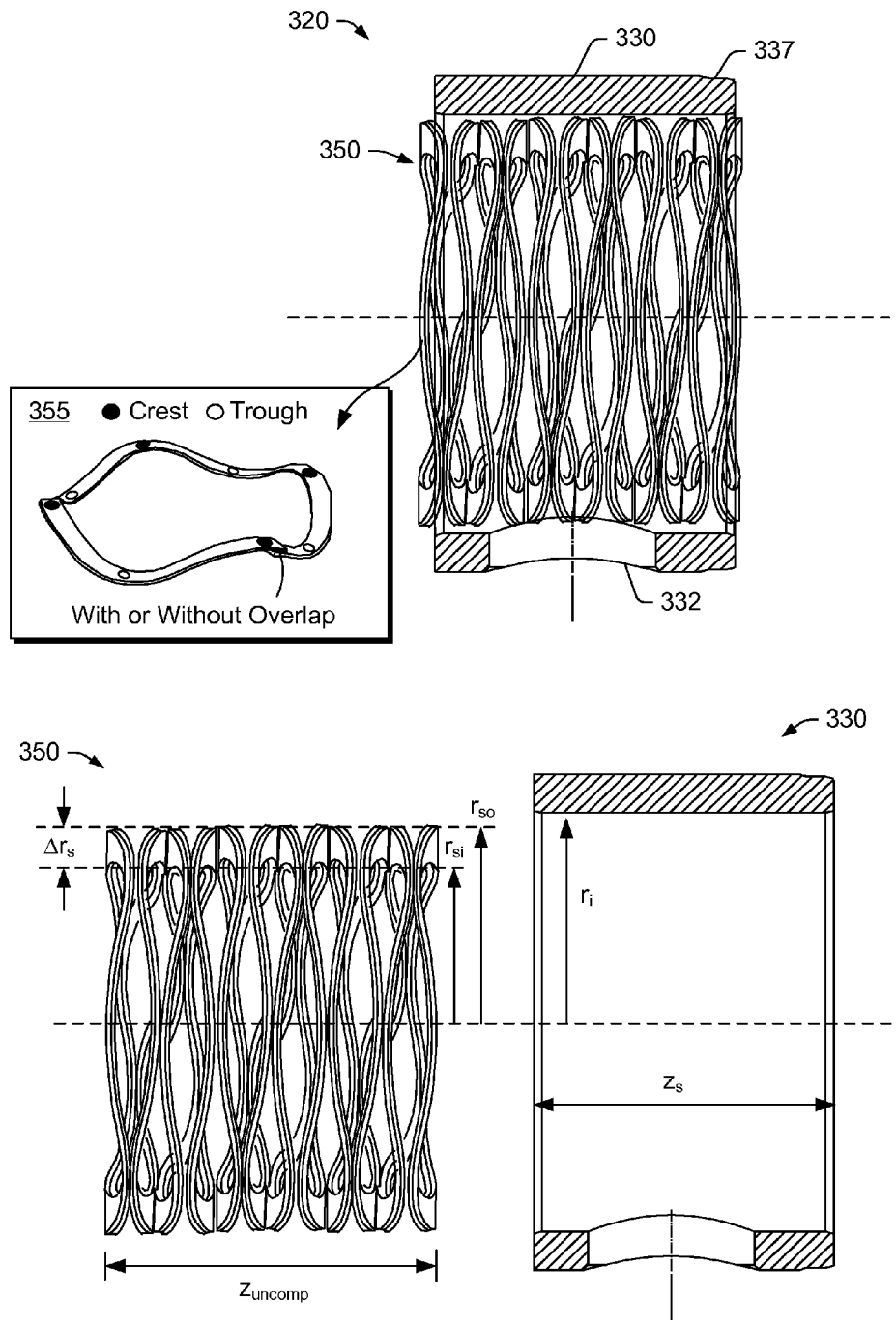
FIG. 7 is a series of views of an example of a spacer and an example of a spring.

FIG. 7 shows an example of the assembly 320 that includes the spacer 330 and the spring 350. As an example, the spring 350 may be a wave spring and made of a material such as a metal (e.g., steel or steel alloy). A wave spring may be configured such that it is not disturbed by its own natural frequency (e.g., "integrated damping"). A wave spring may be an interlaced or interwoven wave spring, a wave spring with or without overlap, a wave spring with or without a gap, etc. FIG. 7 shows an example of a single wave spring element 355 where crests and troughs are labeled. Such elements may be stacked, rotated and stacked, etc., to provide a spring such as the spring 350. The spring 350 may have an appropriate outer radial dimension $r_{so}$ to fit inside a central through bore of the spacer 330 (e.g., having radius $r_i$). The spring 350 may have a contact area defined by a difference $\Delta r_s$ between an inner radius $r_{si}$ and outer radius $r_{so}$ and optionally crests (e.g., consider flat crest regions for contacting and biasing an outer race of a bearing). In the example of FIG. 7, the spring 350 is shown as having an uncompressed axial length $z_{uncomp}$ that exceeds an axial length $z_s$ of the spacer 330. As described herein, some clearance may exist between an inner radius of a spacer (e.g., $r_i$) and an outer radius of a spring (e.g., $r_{so}$), with some assurance that contact will not occur between the spring and a shaft. Clearance may be appropriate to handle a spring or biasing mechanism that changes in radial dimension (or dimensions) depending on length (e.g., compression/decompression). A wave spring may be configured to maintain a relatively constant outer radius over a normal operational amount of axis displacement.

Figure 8:
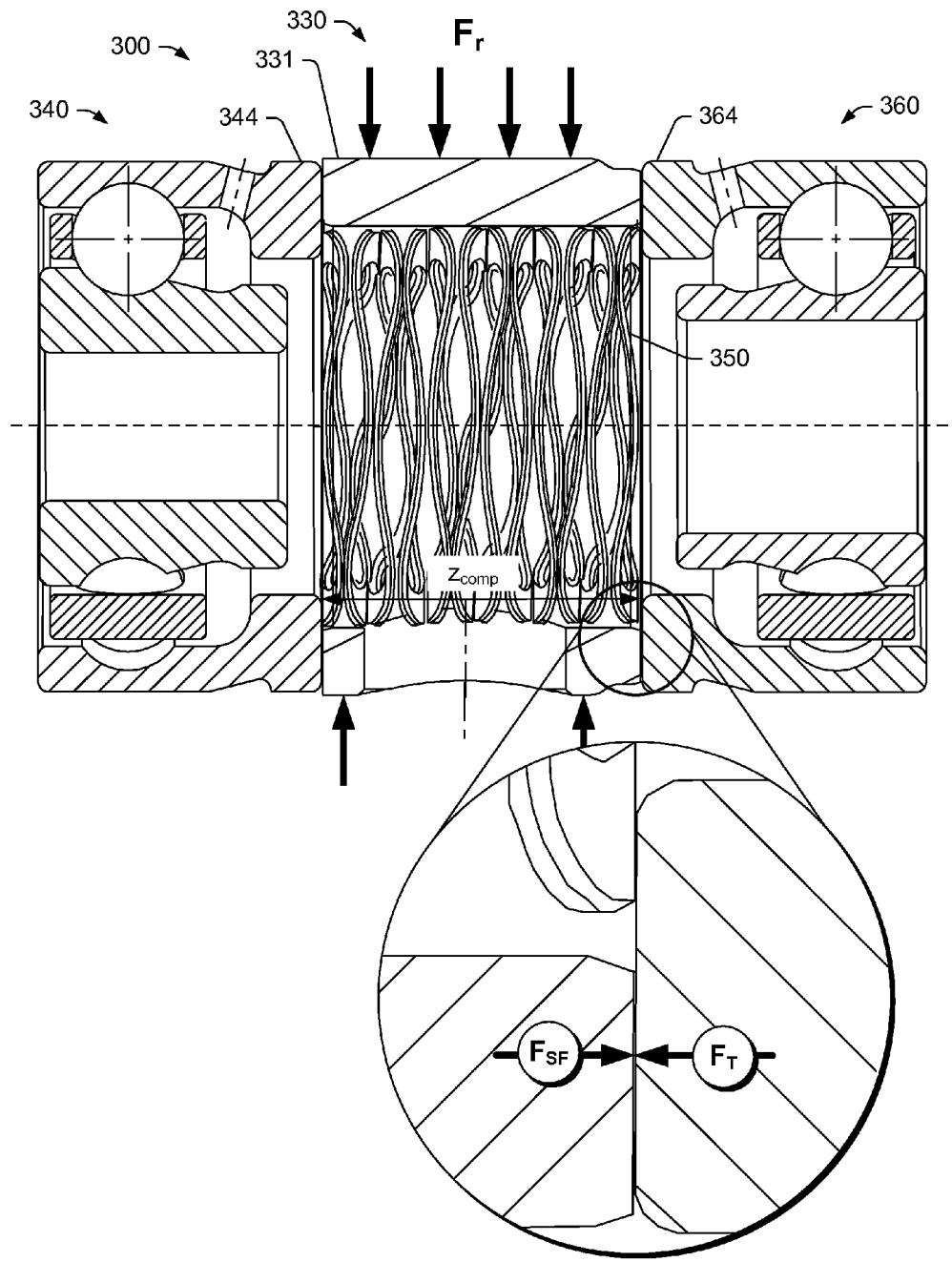
FIG. 8 is a cross-sectional view of an example of a bearing assembly or system that illustrates examples of forces.

FIG. 8 shows the bearing assembly 300 as including the spacer 330, the spring 350 and the bearing assemblies 340 and 360. In the example of FIG. 8, the spring 350 is shown in a compressed state where one end of the spring 350 (e.g., crests, etc.) contacts the bearing assembly 340 (e.g., at the outer race 344) and another end of the spring 350 (e.g., crests, etc.) contacts the bearing assembly 360 (e.g., at the outer race 364). In such an example, the spring may influence dynamic ball bearing assembly behavior. For example, a spring may reduce noise, improve balancing/balanceability and/or improve rolled throughput yield (RTY, which may be defined as a probability of producing zero defects).

An approximate force diagram is also shown where axial forces are opposed. For example, the static friction force of the spacer ($F_{SF}$) due to the radially directed static force of the interference fit ($F_r$) exceeds that of an axial force ($F_T$) carried by the outer race of the turbine ball bearing assembly. Thus, in such an example, the spacer maintains its axial position and acts to locate the outer race of the turbine ball bearing assembly.

As an example, a static force may exist between a spacer and a spacer bore wall of a through bore of a housing where the static force exceeds an operational axial thrust force for a turbocharger.

As an example, a film may exist between an axial end face of the spacer 330 and an axial end face of the outer race 364 of the bearing assembly 360. Such a film may be supported by lubricant flow in a well (e.g., an annular channel).

Figure 9:
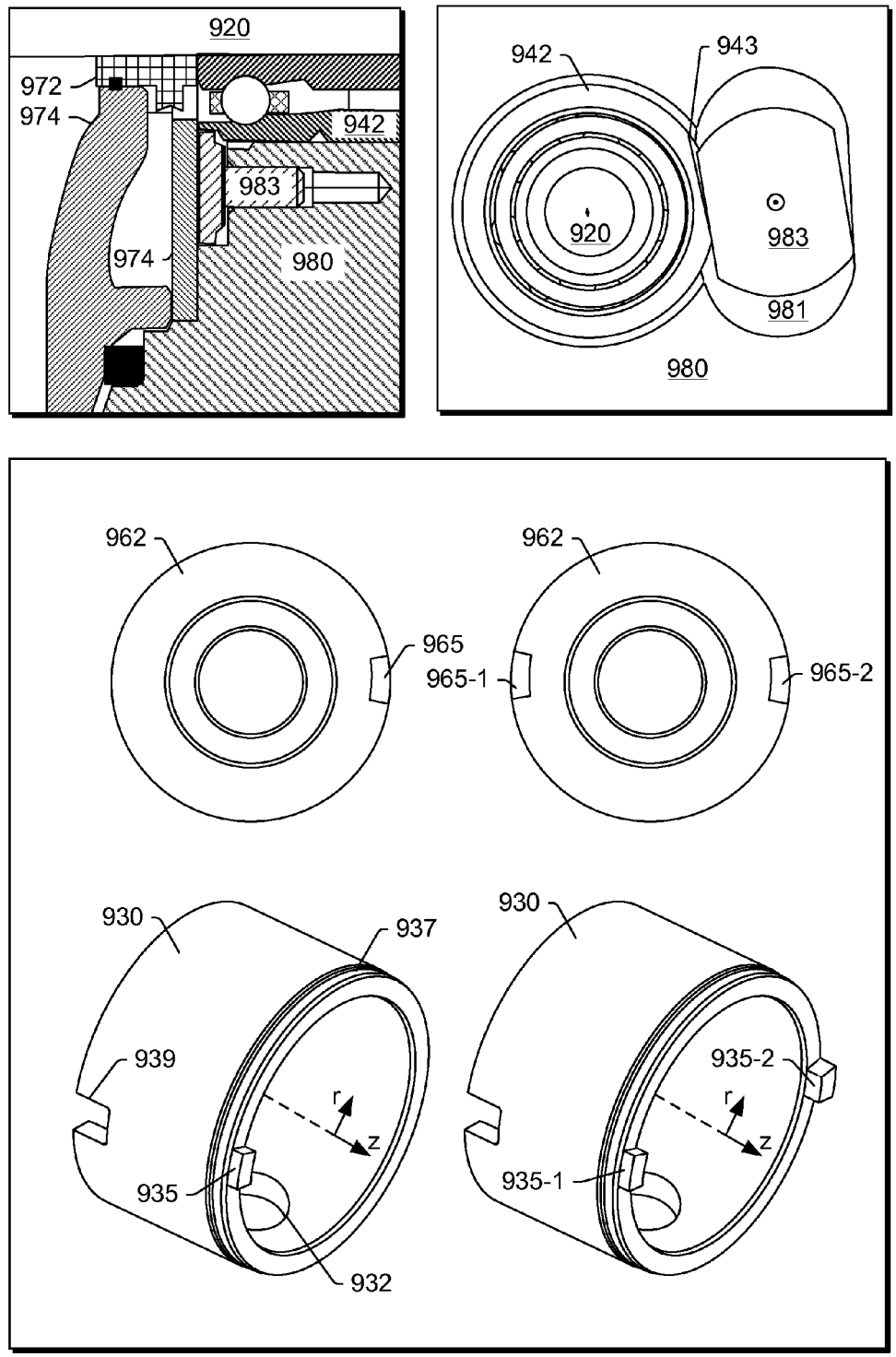
FIG. 9 is a series of views of examples of anti-rotation mechanisms.

FIG. 9 shows various examples of anti-rotation mechanisms, which may optionally be employed to limit rotation of an outer race of a rolling element bearing assembly. As an example, an anti-rotation mechanism may include plate component 983, which may include a pin or may be provided without a pin, that seats in a recess such as a recess 981 of a housing 980. An outer race 942 of a bearing assembly may include a corresponding feature 943, for example, such as a recessed flat that can engage an edge of the plate component 983 to thereby limit rotation of the outer race 942 in a bore of a housing. In such an example, the plate component 983 may be considered a key and the recessed flat feature 943 may be considered a keyway. As an example, such a mechanism may be provided at a compressor end of a housing, for example, along with a thrust collar 972, a back plate 974 and a plate 974 that may cover the plate component 983 and, for example, optionally axially locate the outer race 942 with respect to a compressor side of the outer race 942 (e.g., while an opposing side of the outer race 942 is axially located by a spacer).

As another example, which may be optionally provided as an alternative or in addition to the aforementioned example, a spacer may include one or more features for limiting rotation of an outer race of a bearing assembly. For example, a spacer 930 may be provided with a key 935 and an outer race 962 may be provided with a keyway 965 that can receive the key 935. As shown, more than one key-keyway pair may be provided. As an example, a key may extend from an outer race and a spacer may include a keyway for receipt of the key. As an example, a spacer may include one or more of a key and a keyway. As an example, a spacer may include at least one anti-rotation feature on one side and at least one anti-rotation feature on an opposing side. For example, a spacer may be part of an anti-rotation mechanism for a turbine side rolling element bearing assembly and may be part of an anti-rotation mechanism for a compressor side rolling element bearing assembly.

As an example, a feature 939 of the spacer 930 may provide for orienting the spacer 930 in a bore (e.g. with respect to a lubricant opening 932 and/or one or more features on an opposing side of the spacer), limiting rotation of an outer race (e.g., via receipt of a key of an outer race) or both. Accordingly, the feature 939 may be associated with multiple functions. As an example, a key that extends from an end of a spacer may provide for orienting the spacer in a bore (e.g., with respect to a lubricant opening 932 and/or one or more features on an opposing side of the spacer) and for limiting rotation of an outer race via receipt of the key in a keyway of an outer race. As an example, a key or a keyway may be inset from an outer diameter of a component, for example, consider the key 935 inset such that it has its outer surface disposed at a diameter of a recessed portion 937 of the spacer 930.

As an example, one or more keys, keyways, etc. may be features of an integral spacer. For example, the integral spacer 599 of the housing 598 of FIG. 5 may optionally include one or more of the features described above (e.g., features 935, 939, etc.).

As an example, a ball bearing assembly disposed in a bore of a housing may be fully floating and, for example, include an outer race that rotates during operation. As an example, a ball bearing assembly disposed in a bore of a housing may be semi-floating where an anti-rotation mechanism limits its rotation. As an example, an assembly may include one fully floating ball bearing assembly and one semi-floating ball bearing assembly where the ball bearing assemblies are axially located by a spacer disposed therebetween that has a static friction force with respect to a bore wall of a housing that exceeds operational axial forces carried by either of the ball bearing assemblies (e.g., as experienced during operation of a turbocharger).

As an example, a turbocharger can include a housing that includes a through bore formed at least in part by a turbine side bore wall, a compressor side bore wall and a spacer bore wall disposed between the turbine side bore wall and the compressor side bore wall; a turbine side rolling element bearing assembly disposed adjacent the turbine side bore wall of the through bore of the housing where the turbine side rolling element bearing assembly includes an outer race and where a radial clearance exists between the outer race and the turbine side bore wall of the through bore of the housing; a compressor side rolling element bearing assembly disposed adjacent the compressor side bore wall of the through bore of the housing where the compressor side rolling element bearing assembly includes an outer race and where a radial clearance exists between the outer race and the compressor side bore wall of the through bore of the housing; and a spacer secured in the housing between the turbine side rolling element bearing assembly and the compressor side rolling element bearing assembly via an interference fit with the spacer bore wall of the through bore of the housing where the spacer forms a turbine side axial stop that limits the axial position of the outer race of the turbine side rolling element bearing assembly and forms a compressor side axial stop that limits the axial position of the outer race of the compressor side rolling element bearing assembly.

As an example, a method can include providing a turbocharger housing that includes a bore; providing a spacer; providing a shaft and wheel assembly with a first rolling element bearing assembly seated on a first portion of a shaft of the shaft and wheel assembly; providing a second rolling element bearing assembly; interference-fitting the spacer into the bore; inserting a free end of the shaft into the bore and through the spacer; and inserting the second rolling element bearing assembly into the bore and seating the second rolling element bearing assembly on a second portion of the shaft such that the spacer is disposed intermediate the first portion of the shaft and the second portion of the shaft.

As an example, various acts may be performed by a controller (see, e.g., the controller 190 of FIG. 1), which may be a programmable control configured to operate according to instructions. As described herein, one or more computer-readable media may include processor-executable instructions to instruct a computer (e.g., controller or other computing device) to perform one or more acts described herein. A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit. Such a controller may optionally be programmed to control lubricant flow to a turbocharger, lubricant temperature, lubricant pressure, lubricant filtering, etc.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. A turbocharger comprising:
a housing that comprises a through bore formed at least in part by a turbine side bore wall, a compressor side bore wall and a spacer bore wall disposed between the turbine side bore wall and the compressor side bore wall;
a fully floating turbine side rolling element bearing assembly disposed adjacent the turbine side bore wall of the through bore of the housing wherein the turbine side rolling element bearing assembly comprises an outer race and wherein a radial clearance exists between the outer race and the turbine side bore wall of the through bore of the housing;
a fully floating compressor side rolling element bearing assembly disposed adjacent the compressor side bore wall of the through bore of the housing wherein the compressor side rolling element bearing assembly comprises an outer race and wherein a radial clearance exists between the outer race and the compressor side bore wall of the through bore of the housing; and
a spacer secured in the housing between the turbine side rolling element bearing assembly and the compressor side rolling element bearing assembly via an interference fit with the spacer bore wall of the through bore of the housing wherein the spacer forms a turbine side axial stop that limits the axial position of the outer race of the turbine side rolling element bearing assembly and forms a compressor side axial stop that limits the axial position of the outer race of the compressor side rolling element bearing assembly wherein the spacer comprises a compressor side axial face, a turbine side axial face and a slot that extends axially inwardly from one of the axial faces wherein the slot is configured for a tool that positions the spacer.

2. The turbocharger of claim 1 wherein the spacer comprises a recessed surface on an insertion end and wherein the slot extends axially inwardly from the one of the axial faces that is a trailing end.

3. The turbocharger of claim 1 wherein the spacer comprises a lubricant outlet opening.

4. The turbocharger of claim 1 wherein the turbine side rolling element bearing assembly comprises a ball bearing assembly.

5. The turbocharger of claim 1 wherein the compressor side rolling element bearing assembly comprises a ball bearing assembly.

6. The turbocharger of claim 1 further comprising a spring disposed in a bore of the spacer.

7. The turbocharger of claim 6 wherein the spring comprises a wave spring.

8. The turbocharger of claim 1 wherein a static force exists between the spacer and the spacer bore wall of the through bore of the housing to secure the spacer and wherein the static force exceeds an operational axial thrust force for the turbocharger.

9. The turbocharger of claim 1 wherein the shaft comprises a portion of a shaft and wheel assembly.

10. The turbocharger of claim 1 wherein the turbine side rolling element bearing assembly comprises an inner race fit to the shaft.

11. The turbocharger of claim 1 wherein the compressor side rolling element bearing assembly comprises an inner race fit to the shaft.

12. The turbocharger of claim 1 comprising a compressor wheel connected to the shaft.

* * * * *